J. P. FRANK.
SKID.
APPLICATION FILED MAY 10, 1915.
1,154,986.
Patented Sept. 28, 1915.
FIG_1_
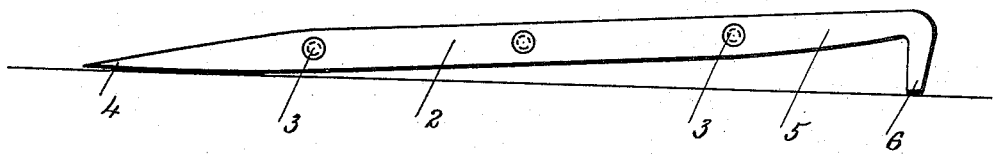
FIG_2_
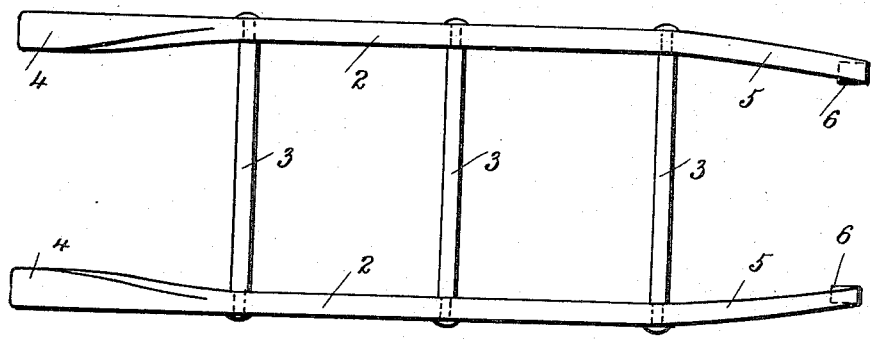
FIG_3_
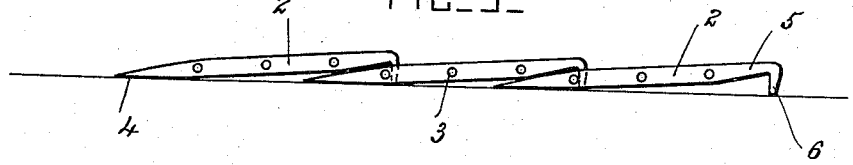
FIG_4_
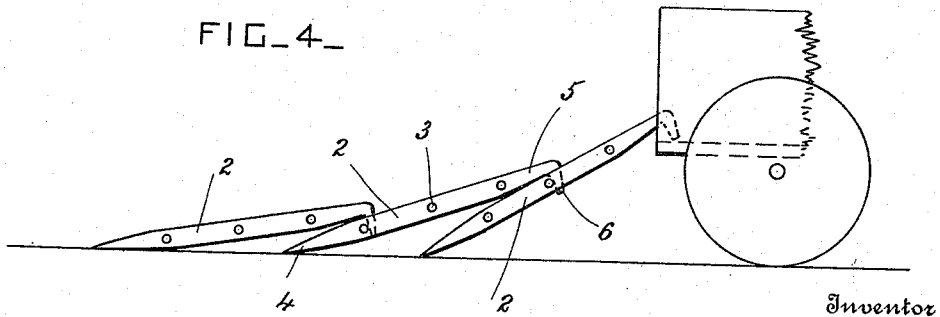
Inventor
John P. Frank
By Herbert W. J. Jenner.
Attorney

UNITED STATES PATENT OFFICE.

JOHN P. FRANK, OF DANVILLE, KENTUCKY.

SKID.

1,154,986.     Specification of Letters Patent.     Patented Sept. 28, 1915.

Application filed May 10, 1915. Serial No. 27,048.

*To all whom it may concern:*

Be it known that I, JOHN P. FRANK, a citizen of the United States, residing at Danville, in the county of Bovle and State of Kentucky, have invented certain new and useful Improvements in Skids; and I do hereby declare the following to be a full, clear, and exact description of the invention, such as will enable others skilled in the art to which it appertains to make and use the same.

This invention relates to skids for loading goods onto carts, and for moving them from place to place in stores; and it consists in the novel construction and combination of the parts hereinafter fully described and claimed.

In the drawings, Figure 1 is a side view of a single skid constructed according to this invention. Fig. 2 is a plan view of the same. Fig. 3 shows three similar skids coupled together. Fig. 4 shows three similar skids arranged to load goods onto a cart.

Each skid consists of two similar side bars 2 arranged parallel to each other and provided at intervals with crossbars 3. Each side bar has a pointed and tapering end portion 4, and its other end has an inclined end portion 5 which terminates in a downwardly projecting hook 6. The parts 5 of the two side bars are also slightly tapered and are inclined toward each other, so that the two hooks 6 of one skid can be dropped between the side bars of any similar skid so as to engage pivotally with one of its crossbars, as shown in Figs. 3 and 4.

A single skid can be used, and its pointed end portions are pushed under the barrel or other load which is slid upon it. The pointed end portion is broader than its side bar, as it is flattened in pointing it, and its outer surface is arranged in line with the outer surface of the side bar.

When three skids are combined together as shown in Fig. 3 with their adjacent ends articulated together, a heavier load can be placed upon them and they can be slid or drawn along to any desired place, the principal weight being on the broad pointed end portions which are slightly rounded and which form runners. When a load, such as a barrel, is to be loaded onto a cart, the skids are placed as shown in Fig. 4, the top skid being hooked onto the cart and being supported by the other skids which are articulated to it with their pointed ends resting on the ground so that the barrel can be rolled up the skids onto the cart. The hooks of the lower skids engage pivotally with the crossbars of the skids next above or in front of them.

What I claim is:

1. A skid or skid member, comprising a pair of side bars, and crossbars secured between them, the middle portions of the side bars being parallel to each other and the end portions at one end being inclined inwardly and provided with hooks adapted to drop between the side bars of a skid of the same width and engage pivotally with one of its crossbars.

2. A skid or skid member, comprising a pair of side bars, and crossbars secured between them, the middle portions of the side bars being parallel to each other and the end portions at the front end being inclined inwardly and provided with hooks adapted to drop between the side bars of a similar skid of the same width and engage pivotally with one of its crossbars, and the end portions at the rear end of the skid being tapered and extended laterally or broadened on the inner sides of the side bars to form runners and bearing surfaces adapted to engage with the inwardly inclined front end portions of the similar skid.

In testimony whereof I have affixed my signature.

JOHN P. FRANK.

Copies of this patent may be obtained for five cents each, by addressing the "Commissioner of Patents, Washington, D. C."